US012084272B2

(12) United States Patent
Ganz et al.

(10) Patent No.: US 12,084,272 B2
(45) Date of Patent: Sep. 10, 2024

(54) TRASH CAN AUTOMATIC LID STABILIZER

(71) Applicants: Christopher R H Ganz, Glassboro, NJ (US); Steven Spinelli, Glassboro, NJ (US)

(72) Inventors: Christopher R H Ganz, Glassboro, NJ (US); Steven Spinelli, Glassboro, NJ (US)

( * ) Notice: Subject to any disclaimer, the term of this patent is extended or adjusted under 35 U.S.C. 154(b) by 0 days.

(21) Appl. No.: 17/873,403

(22) Filed: Jul. 26, 2022

(65) Prior Publication Data

US 2023/0032263 A1 Feb. 2, 2023

Related U.S. Application Data

(60) Provisional application No. 63/226,436, filed on Jul. 28, 2021.

(51) Int. Cl.
*B65F 1/16* (2006.01)
*B65F 1/02* (2006.01)

(52) U.S. Cl.
CPC .............. *B65F 1/1615* (2013.01); *B65F 1/02* (2013.01)

(58) Field of Classification Search
CPC ................................ B65F 1/1615; B65F 1/02
USPC ............................................ 220/495.11, 831
See application file for complete search history.

(56) References Cited

U.S. PATENT DOCUMENTS 8,206,058 B2 * 6/2012 Vrondran ................ E02D 29/14 220/831
9,376,255 B2 6/2016 Banik et al.
9,580,244 B2 2/2017 Reeb et al.
9,821,957 B1 * 11/2017 Hurst .................. E05B 65/5292
9,963,276 B1 5/2018 Arthurs et al.
10,618,730 B2 4/2020 Manssourian
2009/0050627 A1 2/2009 Shinault
2016/0068333 A1 * 3/2016 Yedikian .................. B25H 3/04 220/608
2016/0159570 A1 * 6/2016 Reeb .................. E05B 17/2034 292/197
2016/0257491 A1 * 9/2016 Manssourian ........ B65F 1/1615
2017/0081119 A1 * 3/2017 Blazer ................... B65F 1/1615
2017/0297817 A1 * 10/2017 Reeb ................... E05B 47/0607
2020/0079586 A1 * 3/2020 Asmis ..................... E05B 57/00
2020/0115156 A1 * 4/2020 Hodge .................. B65F 1/1615
2021/0339948 A1 * 11/2021 McCloughen ........ B65F 1/1615
2022/0017301 A1 * 1/2022 Chapman ............. B65F 1/1646
(Continued)

*Primary Examiner* — J. Gregory Pickett
*Assistant Examiner* — Niki M Eloshway
(74) *Attorney, Agent, or Firm* — Boudwin Intellectual Property Law, LLC; Daniel Boudwin

(57) ABSTRACT

A trash can automatic lid stabilizer includes a base that is securable to the perimeter sidewall of a trash can. An arm is pivotally connected to an upper end of the base. A first magnetic coupler is disposed on an upper end of the arm. A second magnetic coupler can be connected to the lid of the trash can, such that the first magnetic coupler is configured to removably secure to the second magnetic coupler. The arm is configured to rotate away from the trash can when the trash can is rotated to an upended position and the lid moves to an open position, and further configured to rotate toward the trash can and overtop the lid after the lid returns to a closed position when the trash can is rotated to an upright position. The arm retains the lid in a closed position when the trash can is upright.

7 Claims, 5 Drawing Sheets

(56) References Cited

U.S. PATENT DOCUMENTS

| | | | | |
|---|---|---|---|---|
| 2022/0315327 | A1* | 10/2022 | Muis | B65F 1/1615 |
| 2023/0249906 | A1* | 8/2023 | Hardman | B65F 1/02<br>280/47.371 |

* cited by examiner

TRASH CAN AUTOMATIC LID STABILIZER

CROSS REFERENCE TO RELATED APPLICATIONS

This application claims the benefit of U.S. Provisional Patent Application Ser. No. 63/226,436, filed on Jul. 28, 2022. The above identified patent application is herein incorporated by reference in its entirety to provide continuity of disclosure.

BACKGROUND OF THE INVENTION

The present invention relates to accessory devices for trash cans. More particularly, the present invention provides a lid stabilizing device for a trash can that maintains the lid in a closed position yet automatically releases and resets when the trash can is turned over to be emptied and returned to an upright position.

Many municipalities and other areas have developed standardized garbage collection operations that include specialized disposal vehicles. These operations typically utilize a common type of trash can that is adapted to be grasped by lifting arms on the specialized disposal vehicle. The specialized disposal vehicle lifting arms lift the trash can and rotate it simultaneously to dump its contents into the waste storage area of the specialized disposal vehicle before placing the trash can back down on the ground in its original upright orientation. These types of trash cans typically include a pivotally affixed lid that opens automatically as the disposal vehicle dumps the contents of the trash can. Because the lid must open automatically as the trash can is dumped, the lid typically does not have any kind of closure latch or other lid securing mechanism. When the trash can is returned to an upright orientation, the lid sometimes returns to a closed position under its own weight, but no fastener is included for maintaining that closed position over time.

While necessary for the operation of the disposal vehicle, having a lid that cannot be secured closed presents additional problems. For example, the lid does not always return to a closed position when placed upright. Even when in a closed position, wind often causes the trash can lid to blow open and act like a sail. The lid catches the wind and causes the trash can to blow down the street where it must be located and retrieved. The lid being open also allows unwanted odors to escape from the interior of the trash can, and further allows unwanted insects or larger animals to access the contents of the trash can. In order to solve these problems, some individuals use rocks or other heavy objects to weigh down the lid. However, these are cumbersome and can cause injury if they fall from the lid. They also may cause damage to the overall structure of the trash can and prevent the disposal vehicle from properly dumping the trash can. In view of the above concerns, it is desirable to provide an accessory device that can be secured to a trash can which allows the trash can's hinged lid to open as normal when the trash can is dumped by the disposal vehicle, yet functions as a closure fastener to maintain the lid in a closed position when the trash can is returned to the ground in its original upright orientation.

Some devices in the known art exist that are designed to attach to trash cans in an attempt to secure the trash can lid in a closed position. However, the devices in the known art have several disadvantages and drawbacks, and do not adequately address the issue of keeping the trash can lid closed due to blowing wind or similar weather conditions without causing additional problems. For example, most devices in the known art lack the ability for the lid to swing open automatically when the trash can is dumped, and then automatically return to the closed position when placed upright again. The devices in the known art typically include complicated fastener arrangements that are prone to failure and that also must be manually engaged or disengaged by an individual. These devices require an individual or the disposal vehicle operator to leave the vehicle and open the lid manually. The individual may forget to latch or unlatch the device which would like to ineffectiveness. Further, if the disposal vehicle operator were required to manually operate the devices in the known art to open or close the lid, the garbage retrieval process would be made more inconvenient and inefficient. Additionally, a trash can may be blown over by the wind, and such mechanical latches are prone to breaking or failure when the can hits the ground. Also, if the latch has not been re-secured by an individual, the lid will open and trash will potentially spill, as well as causing the fallen can to catch wind more easily and potentially be blown further away.

In light of the devices disclosed in the known art, it is submitted that the present invention substantially diverges in functional and design elements from the known art and consequently it is clear that there is a need in the art for an improvement to garbage can lid retention and closure systems. In this regard the present invention substantially fulfills these needs

SUMMARY OF THE INVENTION

In view of the foregoing disadvantages inherent in the known types of trash can lid latches and retainers now present in the prior art, the present invention provides a trash can automatic lid stabilizer, wherein the same can be utilized for conveniently maintaining the lid in a closed position when the trash can is upright, which automatically disengages to allow the lid to open when the trash can is emptied, and automatically re-engages to secure the lid in place when the trash can is returned to an upright position.

The trash can automatic lid stabilizer generally includes a base that is securable to the perimeter sidewall of a trash can. The base can be integral to the trash can or attached with different types of fasteners. An arm is pivotally connected to an upper end of the base. The pivoting connection may be an adjustable hinge pin that can be adjusted to control the rotational speed of the arm when gravity acts on the arm. A first magnetic coupler is disposed on an upper end of the arm. A second magnetic coupler can be integrally formed with or connected to the lid of the trash can, such that the first magnetic coupler is configured to removably secure to the second magnetic coupler. The arm is configured to rotate away from the trash can when the trash can is rotated to an upended position and the lid moves to an open position, and further configured to rotate toward the trash can and overtop the lid after the lid returns to a closed position when the trash can is rotated to an upright position. In this way, the arm retains the lid in a closed position when the trash can is upright, but allows the trash can to be emptied without requiring an individual to manually disengage the magnetic connectors.

One object of the present invention is to provide a trash can automatic lid stabilizer with magnetic couplers that will remain coupled to maintain the trash can lid in the closed position even if the trash can accidentally falls over.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
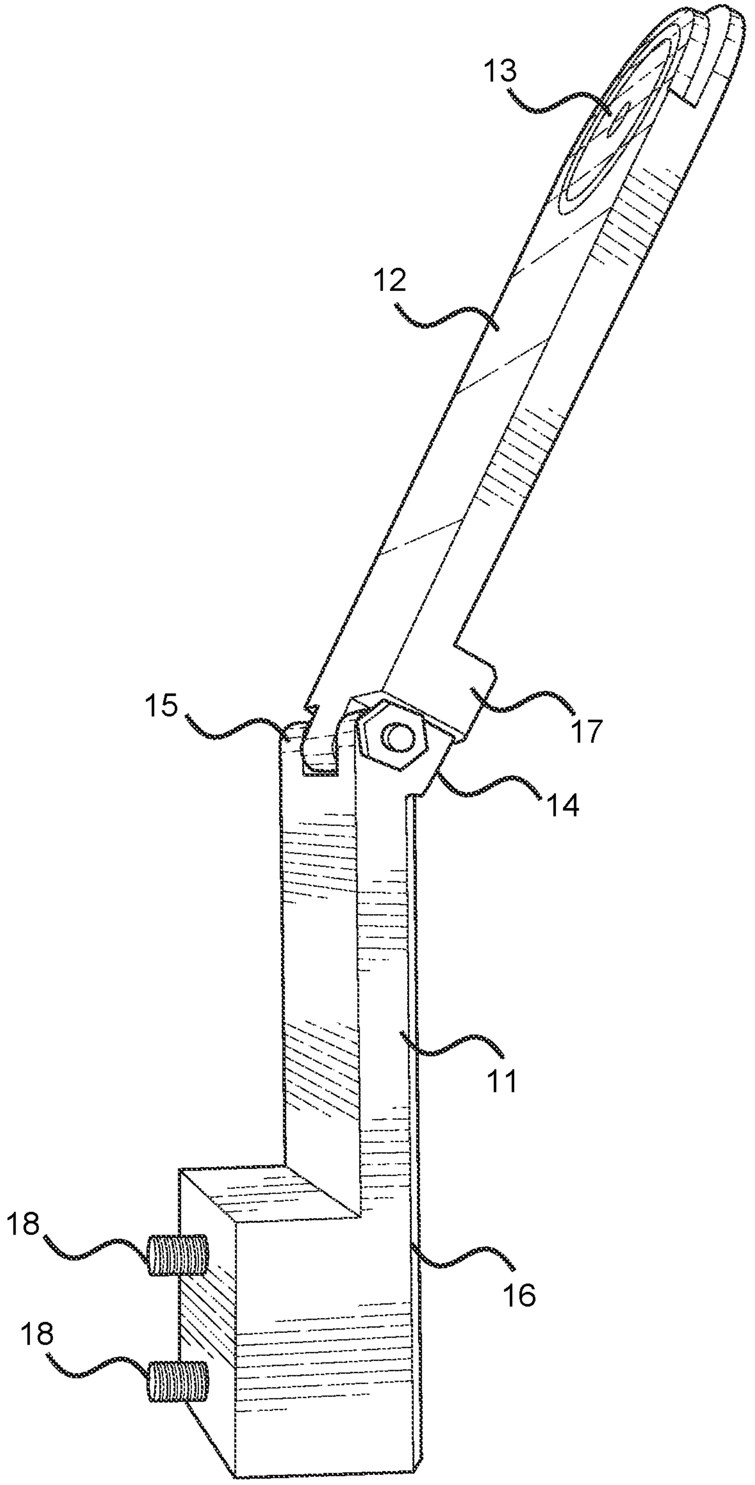
FIG. 1 shows a perspective view of an embodiment of the trash can automatic lid stabilizer.

Reference is made herein to the attached drawings. Like reference numerals are used throughout the drawings to depict like or similar elements of the trash can automatic lid stabilizer. For the purposes of presenting a brief and clear description of the present invention, the preferred embodiment will be discussed as used for conveniently maintaining the lid in a closed position when the trash can is upright, while automatically disengaging to allow the lid to open when the trash can is emptied, and automatically re-engaging to secure the lid in place when the trash can is returned to an upright position. The figures are intended for representative purposes only and should not be considered to be limiting in any respect.

Referring now to FIG. 1, there is shown a perspective view of an embodiment of the trash can automatic lid stabilizer. The device generally includes a base 11 having a mounting fastener configured to secure the base to a sidewall of a trash can. In the shown embodiment, the mounting fastener includes a pair of threaded fasteners 18, which may be inserted through apertures in the lower end 16 of the base, and into corresponding apertures in the trash can. In other embodiments, other mounting mechanisms may be utilized. For example, a strong adhesive or the like may be utilized to secure the base 11 to the trash can sidewall. In other embodiments, such as that shown in FIG. 5, the base 11 may include a clamp that allows the base 11 to removably secure to a siderail, bumper, or like protrusion on the trash can sidewall.

Figure 2:
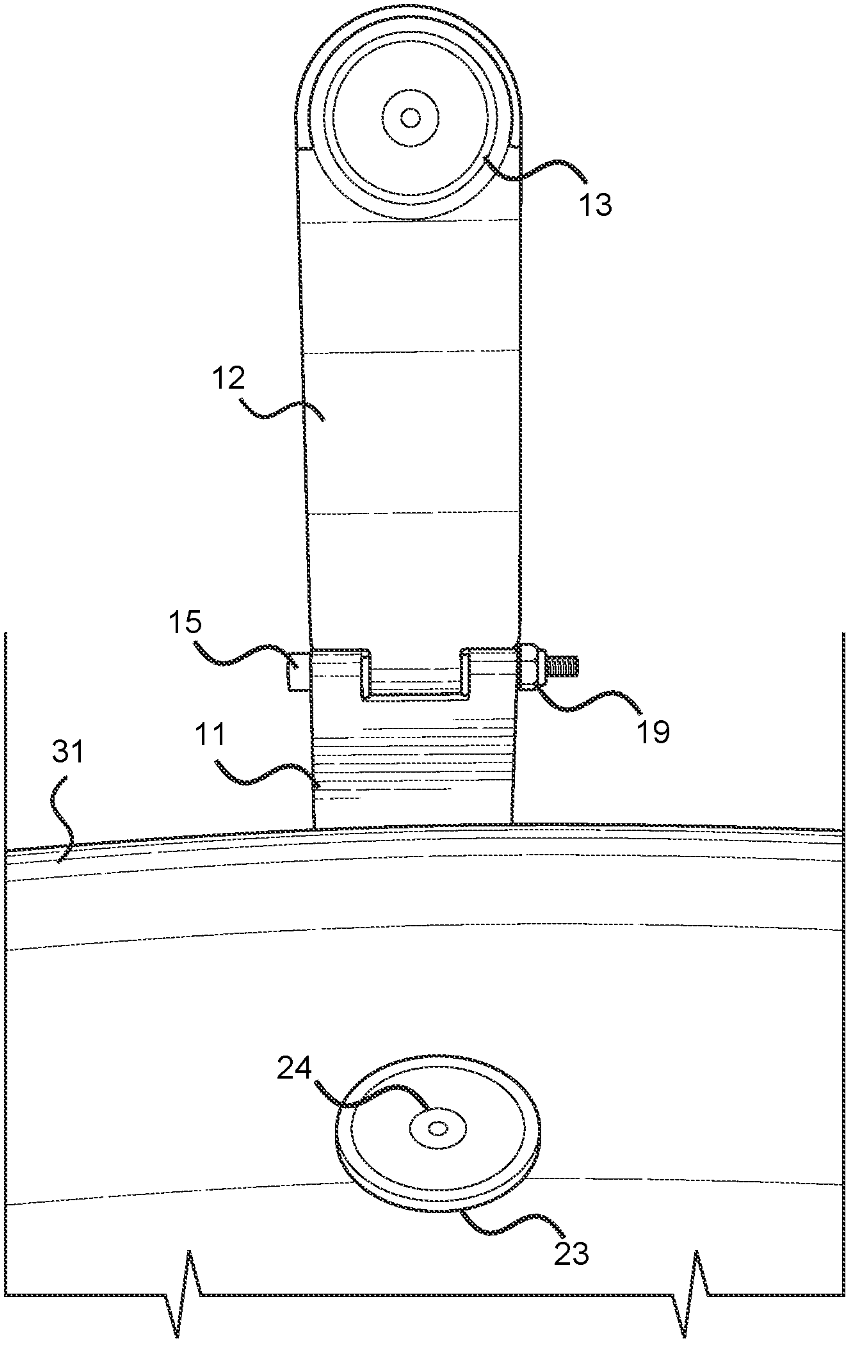
FIG. 2 shows a front perspective view of an embodiment of the trash can automatic lid stabilizer secured to a trash can and with the arm in a raised position away from the lid.
Figure 3:
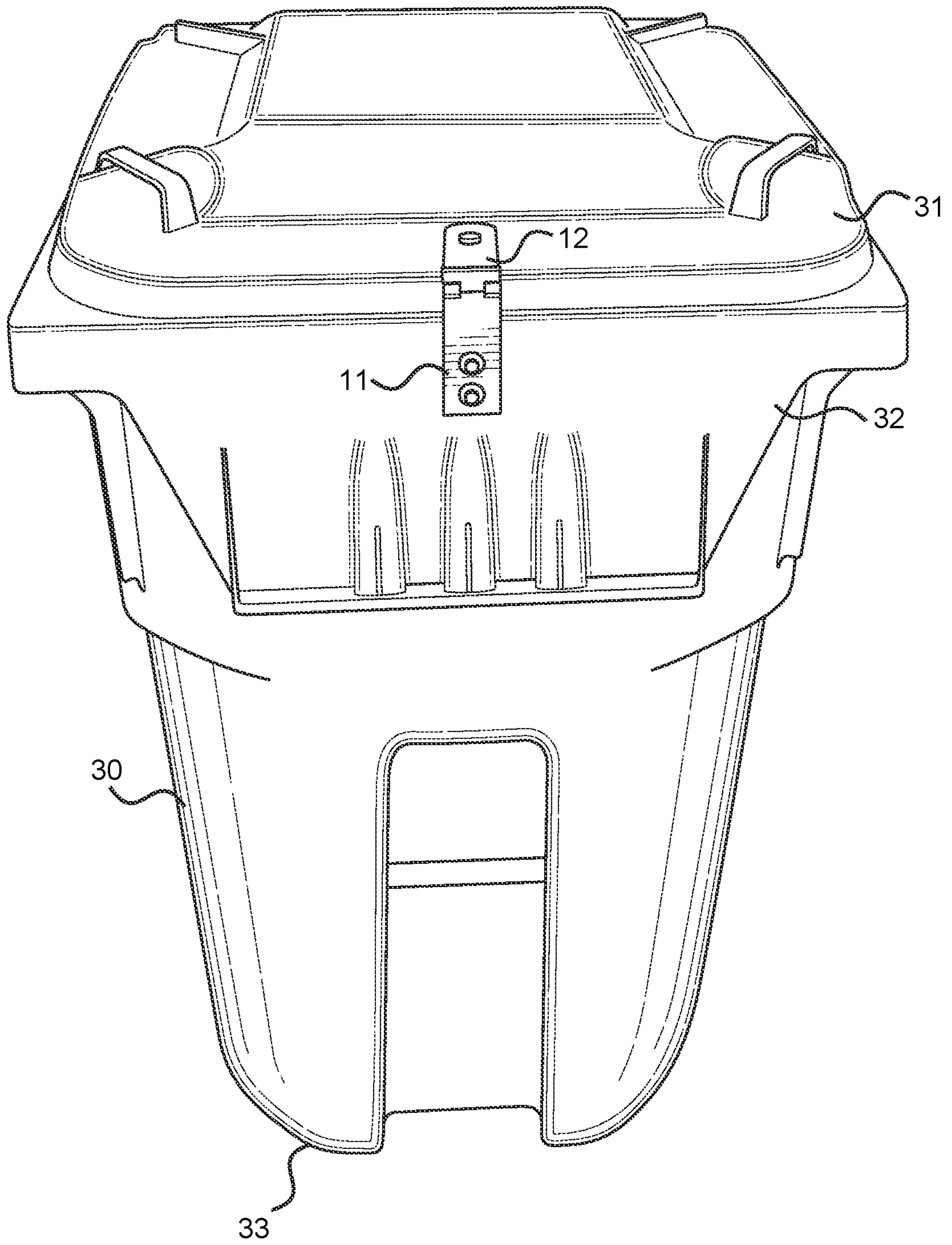
FIG. 3 shows a front perspective view of an embodiment of the trash can automatic lid stabilizer secured to a trash can with the arm in a lowered position overtop the lid.
Figure 4:
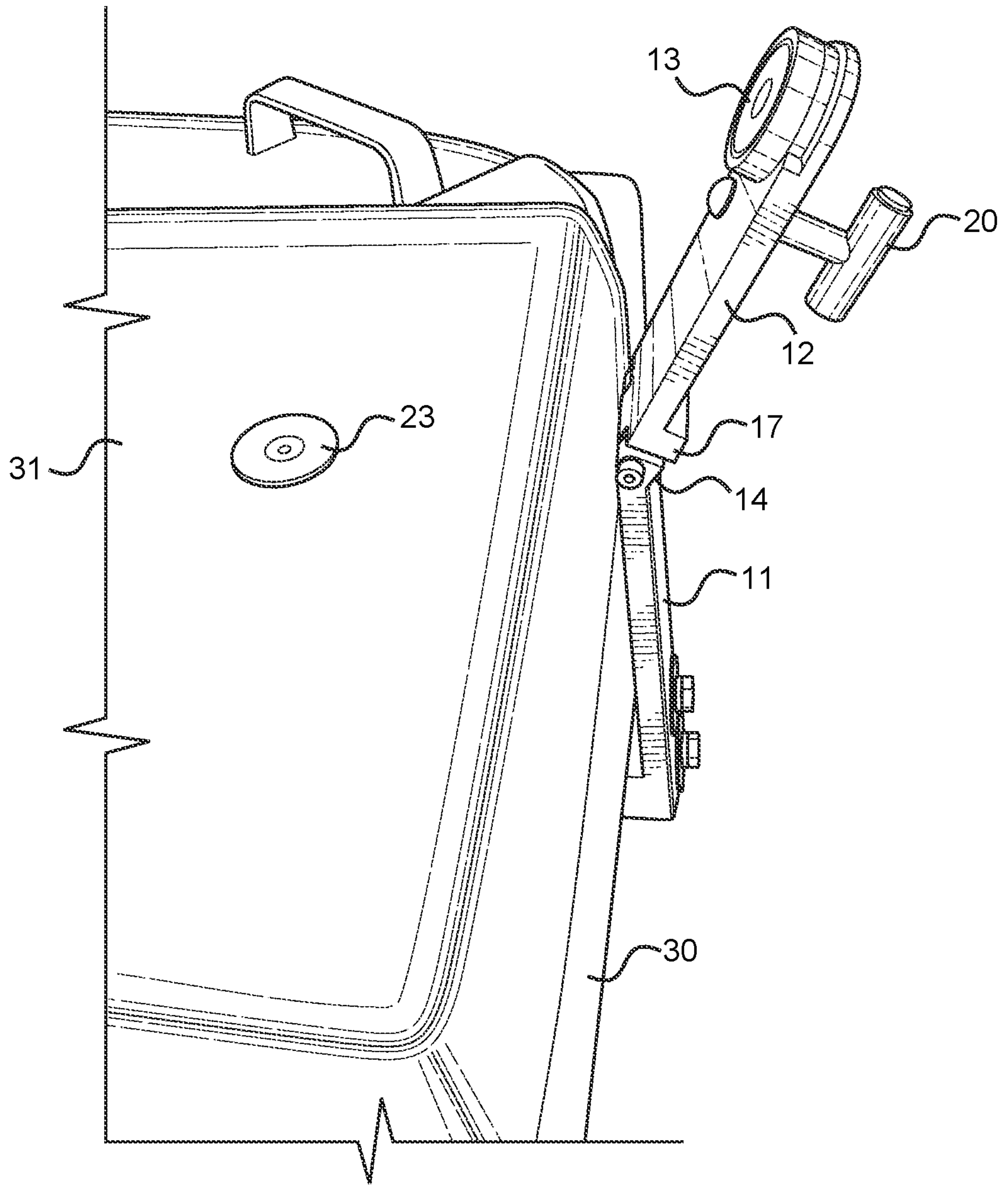
FIG. 4 shows a side perspective view of an embodiment of the trash can automatic lid stabilizer secured to a trash can and with the arm in a raised position away from the lid.

An arm 12 is pivotally connected to an upper end of the base 11, such that the arm can rotate about the pivot point. In the shown embodiments, the arm 12 is connected to the base 11 via a hinge pin, which may be adjustable. In other embodiments, other pivoting connections may be utilized. A first magnetic coupler 13 is disposed on an upper end of the arm 12, which removably engages a second magnetic coupler, as shown in FIGS. 2-4. The magnetic coupler 13 may be attached to the arm 12 via a fastener, or may be integrally formed with the arm 12.

The device further includes an angled stop 14 that is configured to limit the rotation movement of the arm 12 as it rotates away from the trash can lid when the trash can is upended and dumped. In the shown embodiment, the angled stop 14 extends upwardly from the base 11, such that a lower end 17 of the arm 12 contacts the angled stop 14 and is prevent from over rotating. In the shown embodiment, the angled stop 14 prevents the arm 12 from rotating more than thirty degrees with respect to the vertically oriented base 11. This positioning ensures that the arm 12 will always rotate back overtop the closed lid when the trash can is returned to an upright position after being dumped. The hinge pin can be adjusted to control the rate of movement of the arm 12, ensuring that the lid will close before the arm 12 rotates back overtop the lid. In other embodiments, the pivoting connection between the arm 12 and base 11 can include a spring hinge which biases the arm 12 to the lowered or closed position overtop the lid 31. Such a spring hinge would be similarly adjustable to control the relative rate of rotation of the arm 12, ensuring it will always lower after the lid 31 closes.

Referring now to FIG. 2, there is shown a front perspective view of an embodiment of the trash can automatic lid stabilizer secured to a trash can and with the arm in a raised position away from the lid. A second magnetic coupler 23 is configured to secure to an upper surface of a lid 31 of a trash can, such that the first magnetic coupler 13 is configured to removably secure to the second magnetic coupler 23 via magnetic attraction between the two. In the shown embodiment, the second magnetic coupler 23 includes a mounting device 24 configured to secure to an upper surface of a lid of a trash can. The mounting device 24 includes an aperture in the second magnetic fastener 23, an aperture in the lid 31 of the trash can, and a threaded fastener extending therethrough, such that a screw or the like can secure the second magnetic fastener 23 to an existing trash can lid 31. In other embodiments, the second magnetic fastener 23 may be integrally formed within the lid 31 during manufacture of the lid 31.

The arm 12 is shown in a raised position rotated away from the lid 31 of the trash can, which occurs automatically when the trash can is turned upside down and emptied of its contents. In the shown embodiment, the hinge pin 15 includes an adjustable fastener 19, which can tighten or loosen the pivoting connection between the base 11 and arm 12. As the fastener 19 is tightened, more friction is applied, so the arm 12 will rotate back toward the lid 31 more slowly. As the fastener 19 is loosened, less friction is applied, so the arm 12 will rotate back toward the lid 31 more quickly when the trash can is returned to the upright position. The fastener 19 can thus be adjusted to ensure that the lid 31 returns to the closed position more quickly than the arm 12 rotates back to the closed position when the trash can is turned back to its upright orientation, ensuring that the arm 12 will always rotate overtop the lid 31.

Referring now to FIG. 3, there is shown a front perspective view of an embodiment of the trash can automatic lid stabilizer secured to a trash can with the arm in a lowered position overtop the lid. The illustrated trash can 30 includes at minimum a base 33, perimeter sidewalls 32, and a pivotally affixed lid 31, which selectively covers the open upper end of the trash can 30. While the present invention can be utilized with trash cans that are dumped via a lifting arm into a trash vehicle, there is no limit to the type of trash can to which the present invention may apply, as long as it includes a lid 31 that can be held down in a closed position. When the lid 31 is closed, the arm 12 is rotated overtop the lid 31, such that the two magnetic couplers engage and retain the arm 12 and the lid 31 in the closed position. This prevents gusts of wind or other forces from opening the lid 31 when undesired. The magnetic strength of the couplers are selected so that the weight of the lid 31 is enough to uncouple the magnetic couplers when the trash can 30 is turned upside down for dumping, yet so they are strong enough to retain the lid 31 in the closed position when the trash can 30 is upright. Additionally, the magnetic couplers are able to maintain the lid 31 in the closed position even if the trash can 30 accidentally falls over due to wind or other circumstances. This prevents trash from spilling out if the trash can 30 is full, and further prevents the trash can 30 and lid 31 from catching the wind and being blown down the street.

Referring now to FIG. 4, there is shown a side perspective view of an embodiment of the trash can automatic lid stabilizer secured to a trash can and with the arm in a raised position away from the lid. In the shown embodiment, the arm 11 further includes a handle 20 affixed thereto. This allows the arm 11 to be moved by an operator to an open or closed position as needed, so that the lid 12 can be opened without upending the trash can 30. The illustrated trash can 30 has recently been returned to the upright position, so that the lid 31 closes automatically. Due to the angled stop 14 preventing over rotation of the arm 12 away from the lid 31, the arm 12 will always rotate back overtop the lid 31, no matter the original orientation of the trash can 30. Once rotated back overtop the lid 31, the magnetic coupler 13 of the arm 12 automatically couples to the magnetic coupler 23 of the lid 31, preventing wind or other forces from opening the lid 31 before the trash can is needed to be dumped again. The handle 20 allows the user to easily rotate the arm 11 away from the lid 31 when placing garbage, recycling, or the like into the trash can 30. The arm 11 can then be rotated back to the closed position overtop the closed lid 31, allowing the lid 31 to be opened manually as needed to fill the trash can 30 prior to it being overturned and emptied.

Figure 5:
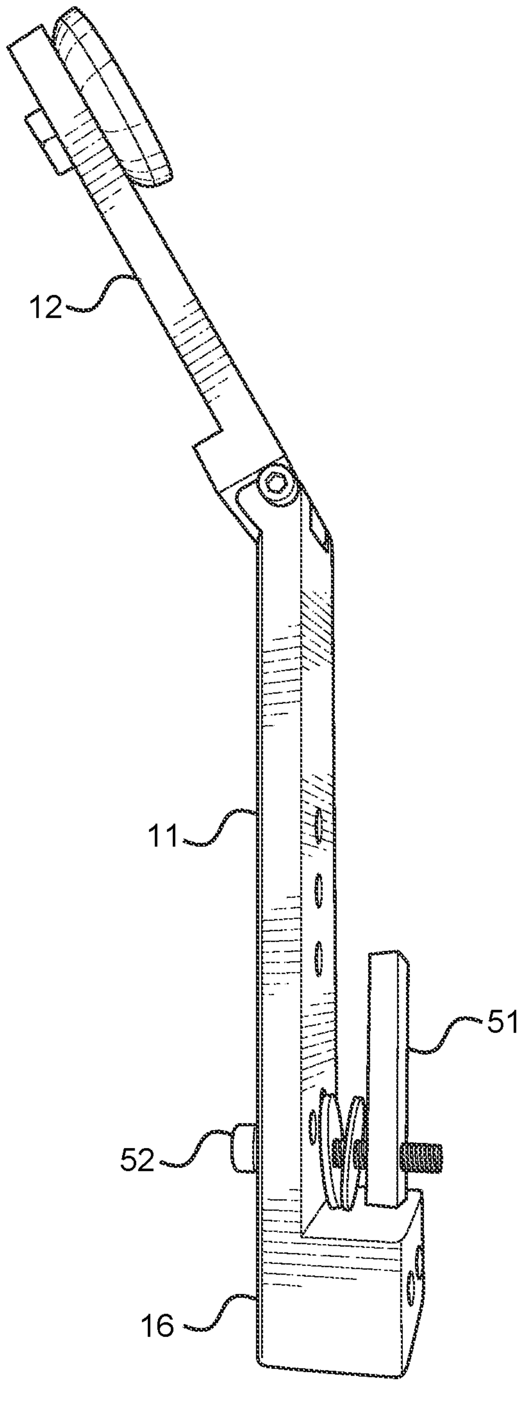
FIG. 5 shows a perspective view of an alternate embodiment of the trash can automatic lid stabilizer.

Referring now to FIG. 5, there is shown a perspective view of an alternate embodiment of the trash can automatic lid stabilizer. In some embodiments, the base mounting fastener comprises a clamp configured to removably secure to an exterior siderail of the trash can. The clamp can include a threaded fastener 52 and a threaded retainer 51, such that the base 11 and retainer 51 engage opposing sides of the siderail that extends around the exterior of the trash can sidewalls. The lower end 16 of the base 11 can also include a protruding profile to fit more closely to the surfaces of the sidewall for a more secure attachment. This configuration allows users to easily and removably secure the trash can automatic lid stabilizer to an existing trash can without drilling holes or otherwise damaging the structure of the trash can.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A trash can automatic lid stabilizer, comprising:

a generally-vertical base having a mounting fastener configured to secure the generally-vertical base to a sidewall of a trash can;

an arm pivotally connected to an upper end of the generally-vertical base;

a first magnetic coupler disposed on an upper end of the arm; and a second magnetic coupler configured to secure to an upper surface of a lid of the trash can;

wherein the first magnetic coupler is configured to be removably secured to the second magnetic coupler;

further comprising an angled stop configured to limit the rotational movement of the arm away from the trash can;

wherein the second magnetic coupler includes a mounting device configured to secure to an upper surface of a lid of a trash can; and wherein the second magnetic coupler mounting device comprises an aperture in the second magnetic fastener that receives a threaded fastener therethrough.

2. The trash can automatic lid stabilizer of claim 1, wherein the angled stop is configured to restrict the movement of the arm to 30 degrees with respect to a generally-vertical base.

3. The trash can automatic lid stabilizer of claim 1, wherein the generally-vertical base mounting fastener comprises a clamp configured to removably secure to an exterior side rail of the trash can.

4. The trash can automatic lid stabilizer of claim 1, wherein the generally-vertical base mounting fastener comprises an adhesive material.

5. The trash can automatic lid stabilizer of claim 1, wherein the generally-vertical base mounting fastener comprises a threaded fastener.

6. The trash can automatic lid stabilizer of claim 1, wherein the arm further comprises a handle affixed thereto.

7. A trash can and automatic lid stabilizer system, consisting of:

a trash can having a bottom, a perimeter sidewall, an open upper end, and a lid pivotally attached to the perimeter sidewall;

an automatic lid stabilizer comprising a generally-vertical base secured to the perimeter sidewall of the trash can;

an arm pivotally connected to an upper end of the generally-vertical base;

a first magnetic coupler disposed on an upper end of the arm; and a second magnetic coupler disposed on the lid of the trash can;

wherein the first magnetic coupler is configured to removably secure to the second magnetic coupler;

wherein the second magnetic coupler includes a mounting device that secures the magnetic coupler to the lid of the trash can;

wherein the second magnetic coupler device comprises an aperture in the second magnetic fastener, an aperture in the lid of the trash can, and a threaded fastener extending therethrough;

wherein the arm is configured to rotate away from the trash can when the trash can is rotated to an upended position and the lid moves to an open position, and is further configured to rotate toward the trash can and overtop the lid after the lid returns to a closed position when the trash can is rotated to an upright position;

wherein the arm further comprises a handle affixed thereto;

wherein the automatic lid stabilizer further comprises an angled stop configured to limit the rotational movement of the arm away from the trash can;

wherein the angled stop is configured to restrict the movement of the arm to thirty degrees with respect to the generally-vertical base;

wherein the generally-vertical base mounting fastener of the automatic lid stabilizer comprises a clamp removably secured to an exterior side rail of the trash can;

wherein the generally-vertical base mounting fastener of the automatic lid stabilizer comprises an adhesive material; and wherein the generally-vertical base mounting fastener of the automatic lid stabilizer comprises a threaded fastener disposed on the generally-vertical base and an aperture on the perimeter sidewall of the trash can.

* * * * *